United States Patent Office 3,511,885
Patented May 12, 1970

3,511,885
OLEFIN CONVERSION AND CATALYST
THEREFOR
William B. Hughes, Bartlesville, Okla., assignor to Phillips Petroleum Company, a corporation of Delaware
No Drawing. Filed Dec. 11, 1967, Ser. No. 689,291
Int. Cl. C07c 1/00, 3/00
U.S. Cl. 260—666        8 Claims

ABSTRACT OF THE DISCLOSURE

Olefins are converted into other olefinic products by contact with a catalyst system comprising a complex compound of rhodium and a halide or organohalide of aluminum, boron, or zinc.

---

This invention relates to the conversion of olefin hydrocarbons into other olefinic products and to a catalyst for effecting such conversion. In one aspect this invention relates to a catalyst system comprising a complex compound of rhodium and a halide or organohalide of aluminum, boron, or zinc for converting olefin hydrocarbons into other olefinic products. In another aspect this invention relates to a process for converting olefin hydrocarbons into other olefinic products utilizing a catalyst system comprising a coordination compound or a complex of rhodium together with a metal halide.

The conversion of olefins to other olefinic products is an operation which can be carried out advantageously in a number of situations. For example, a more plentiful olefin can be converted to a less plentiful and thereby more valuable olefin. The present invention is directed to a convenient process for making such olefin conversions.

According to the invention olefins are converted into other olefinic products by contact with a catalyst system component of the catalyst system is a complex rhodium compound having the formula:

$$L_xL'_yRhX$$

wherein L and L' are ligands and X is halide, cyanide or (RCOO)- radical together with a second component which is a halide or organohalide of aluminum, boron or zinc. In a preferred embodiment of the invention 4-vinylcyclohexene is converted to ethylbenzene and ethylcyclohexene over a system prepared from the admixture of bis(triphenylphosphine)carbonylchlororhodium and ethylaluminum dichloride.

The catalyst which is used in the present invention is prepared by the admixture of two components. The first component of the catalyst system is a complex rhodium compound having the formula:

$$L_xL'_yRhX$$

wherein X is halide, cyanide or a (RCOO)- radical; L is a cyclic or acyclic or acyclic monoamine having up to 20 carbon atoms per molecule, a compound having the formula $$R_3M$$

or a compound having the formula $$(RO)_3M$$

wherein M is phosphorus, arsenic or antimony, R is an aromatic or saturated aliphatic hydrocarbon radical having up to about 20 carbon atoms per radical including halo and hydrocarboxy derivatives thereof; L' is CO or a monoolefin, a chelating diolefin or a chelating diamine having up to about 20 carbon atoms per molecule in the form of aromatic or saturated aliphatic hydrocarbon radicals; and $x$ and $y$ can be either 1 or 2 and the sum of $x$ and $y$ will equal 3 except where L is a bidentate ligand in which case the sum of $x$ and $y$ will be 2.

Some examples of monoolefin ligands are propylene, ethylene, butane-1, dodecane-1, eicosene-4, and the like. Some examples of chelating diolefins are 1,5-cyclooctadiene, norbornadiene, dicyclopentadiene, and the like. Some examples of monoamine ligands are methylamine, ethylamine, tributylamine, pyridine, benzylamine, aniline, cyclopentylamine, eicosylamine, the picolines, the lutidines, and the like. Some examples of chelating diamine ligands are ethylenediamine, N,N,N',N'-tetramethylethylenediamine, 1,2-diaminocyclohexane, N,N,N',N'-tetrabutylbutene-1,4-diamine, and the like. Some examples of $R_3M$ and $(RO)_3M$ ligands are triphenylphosphine, tri(p-xylyl)phosphine, tributylphosphite, tribenzylarsine, tris-(4-trifluoromethylphenyl)stibine, trimethylarsenite, tricyclopentylphosphine, eicosyl dimethylstibine, and the like.

Some examples of suitable rhodium complexes which can be used as the first component of the catalyst system are bis(triphenylphosphine)carbonylchlororhodium;
bis(tributylphosphine)carbonylchlororhodium;
bis(triphenylarsine)carbonyliodorhodium;
bis(triphenylstibine)carbonylchlororhodium;
(pyridine)dicarbonylcyanorhodium;
(triphenylphosphine)(1,5-cyclooctadiene)chlororhodium;
(triphenylphosphine)bis(ethylene)fluororhodium;
bis(tributylphosphite)carbonylacetorhodium; and the like, and mixtures thereof.

The second component of the catalyst system is a halide of aluminum, boron, or zinc or organo halides of these metals in which some, but not all, of the halogen atoms are replaced by radicals having the identity of R described in paragraphs above. Some examples of these metal halides which are suitable for use as second components for the catalyst system are ethylaluminum dichloride; aluminum tribromide; aluminum trichloride; silver fluoroborate; zinc diiodide; zinc dichloride; diethylaluminum fluoride, methylzinc bromide; boron trichloride; and the like, and mixtures thereof.

The above-described first and second catalyst components are generally combined, for use in this invention, in equimolar proportions. However, other molar proportions can be used such as in the range of 3:1 to 1:3 but this is generally accompanied by inferior results.

The catalyst is prepared simply by combining the first and the second catalyst components for a sufficient time and under conditions which permit the catalytically active reaction product to be formed. In general, the catalyst components are combined at 50–130° C. for a time in the range of a few seconds and up to about several hours in the presence of a diluent in which both of the components are at least partially soluble. Any convenient diluent such as chlorobenzene, methylene chloride, benzene, cyclohexane, pentane, and the like can be used for this purpose. After the reaction product is formed, it need not be isolated but can be added directly into the reaction zone as a dispersion in its preparation solvent. If desired, the catalyst components can be separately added, in any order, to the reaction zone either in the presence or absence of the olefin to be converted.

The process of the present invention is broadly applicable to the conversion of alkenylcycloalkene compounds having up to about 20 carbon atoms per molecule and corresponding to the formula

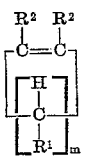

where one $R^1$ is

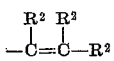

$m$ is 3 to 10 inclusive; and each of the remaining $R^1$ groups and each of the $R^2$ groups is hydrogen, an aromatic or a saturated aliphatic hydrocarbon radical having from 1 to about 10 carbon atoms. Some examples of such alkenylcycloalkene compounds are: 3-vinylcyclohexene; 2,3-dimethyl-4-vinylcyclohexene; 4-(1-propenyl)cyclohexene; 4 - (butenyl)cyclodecene; 3-(5 - phenyl-1-hexenyl)cyclohexene; 3 - cyclohexyl-4-vinylcyclohexene; 3-benzyl-4-(1 - methylvinyl)cyclohexene; 4 - (1-octenyl) cyclododecene; and the like, and mixtures thereof.

A preferred class of olefinic compounds is represented by the formula

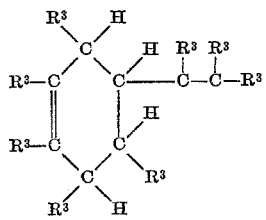

wherein each $R^3$ is hydrogen or an alkyl radical having up to about 5 carbon atoms and wherein fewer than 5 such alkyl radicals are present in the molecule. The above-mentioned alkenylcycloalkene olefin compounds are converted to alkylbenzenes and alkylcycloalkenes according to the process of the invention.

Some examples of the preferred class of olefinic field compounds are 4-vinylcyclohexene; 2-methyl-4-vinyl-cyclohexene; 3-n-pentyl - 5 - vinylcyclohexene; 1,2,3-tri-methyl-4-vinylcyclohexene; 4-(1 - hexenyl)cyclohexene; 1-methyl-4-(1-methylvinyl)cyclohexene; and the like.

The conversion of 4-vinylcyclohexene is a presently preferred embodiment of the invention. The 4-vinylcyclohexene is converted to ethylbenzene and ethylcyclohexene.

The olefin conversion can take place at any convenient temperature within the broad range of 0–200° C., preftrably 50–150° C., and at any convenient pressure which is sufficient to maintain a liquid phase. A reaction diluent can be used if desired and diluents such as the solvents previously described for the catalyst preparation can be used. The time of contact will depend upon the reactivity or activity of the specific olefins and catalyst systems employed as well as upon the desired degree of conversion. The reaction time will, however, generally be in the range of a few minutes to about 20 hours. The proportion of catalyst composition to feed olefin in the reaction zone will vary widely depending upon the rate of reaction desired but will generally be in the range of from about 0.001 to about 0.1 mole of rhodium complex per mole of olefin feed.

Any conventional contacting technique can be utilized for the olefin conversion process and batchwise or continuous operation can be utilized. After the reaction period, the products can be separated and//or isolated by conventional means such as by fractionation, crystallization, adsorption, and the like. Unconverted feed materials can be recycled.

The invention can be further illustrated by the following examples.

EXAMPLE I

The compound, 4-vinylcyclohexene (4-VCH), was converted to ethylbenzene and ethylcyclohexene by contact with a catalyst comprising bis(triphenylphosphine)carbonylchlororhodium and aluminum trichloride.

A 0.35 g. (0.5 mmole) quantity of bis(triphenylphosphine)carbonylchlororhodium and 30 cc. chlorobenzene were stirred in a 7 oz. pressure bottle at room temperature until the rhodium complex had dissolved to give a golden yellow solution. A 0.07 g. quantity of $AlCl_3$ (an amount equimolar with the rhodium complex) was added after which the bottle was evacuated and purged of air with nitrogen. After stirring for an additional 0.5 hour at room temperature, 5.0 cc. of 4-vinylcyclohexene was added and the bottle was placed in a heating bath for 1½ hours. The initial and final temperature of the bath was 65 and 85° C. respectively. The bottle was removed from the bath and, after standing overnight, its contents were analyzed by gas-liquid chromatography.

Simultaneously with the above run, several other essentially identical conversions were also carried out except that $AgBF_4$ and ethylaluminum dichloride ($EtAlCl_2$) were used in place of $AlCl_3$. For purposes of comparison, one test was carried out using only the rhodium complex but with no second catalyst component.

The analytical results of these tests are shown in the following table (diluent-free basis).

TABLE I.—COMPOSITION OF PRODUCT

| Test No. | Rhodium complex | Second catalyst component | 4-VCH, wt. percent | Ethylcyclohexene, wt. percent | Ethylbenzene, wt. percent |
|---|---|---|---|---|---|
| 1 | 0.5 mmole | 0.5 mmole $AlCl_3$ | 39 | 32 | 28 |
| 2 | 0.5 mole | 0.5 mmole $AgBF_4$ | 17 | 44 | 39 |
| 3 | 0.5 mole | 0.5 mmole $EtAlCl_2$ | 12 | 46 | 42 |
| 4 | 0.5 mole | None | 100 | 0 | 0 |

The data in the table above illustrate the effectiveness of three different second catalyst components for the conversion of 4-VCH to ethylcyclohexene and ethylbenzene. The data also show that both catalyst components must be present. ($AlCl_3$ by itself is also essentially inactive in this system.)

EXAMPLE II

4-VCH was converted to ethylbenzene and ethylcyclohexene in a manner essentially identical to that of Example I except that the corresponding arsine complex was used instead of the phosphine.

A 0.39 g. quantity (0.5 mmole) of bis(triphenylarsine) carbonylchlororhodium was dissolved in 30 cc. chlorobenzene and mixed with 0.5 cc. of a 1 molar solution of ethylaluminum dichloride in chlorobenzene. The mixture was stirred for 0.5 hour at room temperature, combined with 6.0 cc. 4-VCH, and heated in an 80° C. bath for about 1 hour. The reaction mixture was then subjected to gas-liquid chromatographic analysis.

Simultaneously with the above run, another conversion was carried out under identical conditions except that the 4-VCH was added to the rhodium complex solution and stirred for 0.5 hour before the ethylaluminum dichloride was added. The results of these two tests are shown in the table below.

TABLE II.—COMPOSITION OF PRODUCT

| Test No. | Order of addition | 4-VCH, wt. percent | Ethyl-cyclo-hexene, wt. percent | Ethyl-benzene, wt. percent |
|---|---|---|---|---|
| 5 | Rhodium complex, EtAlCl₂, VCH. | 42.5 | 30.5 | 27 |
| 6 | Rhodium complex, VCH, EtAlCl₂. | 44 | 30 | 26 |

The data above show that the arsine-containing catalyst is also effective for this conversion, and that the order of addition of the second catalyst component is not critical.

EXAMPLE III

In a manner largely identical with that of Example I, 4-VCH was converted over a stibine-containing catalyst composition.

A reaction mixture comprising 0.22 g. (0.25 mmole) of bis(triphenyl-stibine)carbonylchlororhodium, 15 cc. chlorobenzene, and 0.25 mmole of ethyl-aluminum dichloride was contacted with 4 cc. of 4-VCH at 80° C. for 1.5 hours. Analysis of the reaction mixture showed the presence of ethylcyclohexene and ethylbenzene.

That which is claimed is:

1. A process of preparing alkylbenzenes and alkylcyclohexenes by contacting at least one alkenylcycloalkene compound represented by the formula:

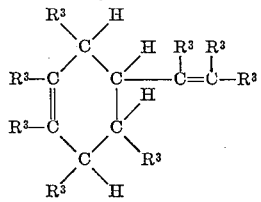

wherein each $R^3$ is hydrogen or an alkyl radical having up to about 5 carbon atoms and wherein fewer than 5 such alkyl radicals are present in the molecule, with a catalyst system consisting essentially of (A) a complex rhodium compound having the formula:

$$L_xL'_yRhX$$

wherein X is a halide, L' is CO, and L is a compound having the formula $R_3M$ wherein M is phosphorus, arsenic or antimony, and R is an aromatic hydrocarbon radical having up to about 20 carbon atoms per radical, $x$ is 2, and $y$ is 1; and (B) a halide or organohalide compound selected from the group consisting of ethylaluminum dichloride, aluminum trichloride, and silver fluoroborate, under conditions which include a temperature range of 0–200° C., a contact time of from a few minute to about 20 hours, and at a ratio of the catalyst to the alkenylcycloalkene compound in the range of from about 0.001 to about 0.1 mole of rhodium complex per mole of the alkenylcycloalkene compound.

2. A process according to claim 1 wherein (A) is bis(triphenylphosphine)carbonylchlororhodium, bis(triphenylarsine)carbonylchlororhodium, or bis(triphenylstibine)carbonylchlororhodium.

3. A process according to claim 1 wherein (A) is bis(triphenylphosphine)carbonylchlororhodium and (B) is ethylaluminum dichloride, AgBF₄ or AlCl₃.

4. A process according to claim 1 wherein (A) is bis(triphenylarsine)carbonylchlororhodium or bis(triphenylstibine)carbonylchlororhodium and (B) is ethylaluminum dichloride.

5. A catalyst system consisting essentially of
(A) a complex rhodium compound having the formula:

$$L_xL'_yRhX$$

wherein X is a halide, L' is CO, and L is a compound having the formula $R_3M$ wherein M is phosphorus, arsenic or antimony, and R is an aromatic hydrocarbon radical having up to about 20 carbon atoms per radical, $x$ is 2 and $y$ is 1; and
(B) a halide or organohalide compound selected from the group consisting of ethylaluminum dichloride, aluminum dichloride, aluminum trichloride, and silver fluoroborate.

6. A catalyst system according to claim 5 wherein (A) is bis(triphenylphosphine)carbonylchlororhodium, bis(triphenylarsine)carbonylchlororhodium, or bis(triphenylstibine)carbonylchlororhodium.

7. A catalyst system according to claim 5 wherein (A) is bis(triphenylphosphine)carbonylchlororhodium and (B) is ethylaluminum dichloride, AgBF₄ or AlCl₃.

8. A catalyst system according to claim 5 wherein (A) is bis(triphenylarsine)carbonylchlororhodium or bis(triphenylstibine)carbonylchlororhodium and (B) is ethylaluminum dichloride.

References Cited

UNITED STATES PATENTS 3,328,378   6/1967   Pickorski _____ 252—431

DELBERT E. GANTZ, Primary Examiner

V. O'KEEFE, Assistant Examiner

U.S. Cl. X.R.

252—431; 260—429

UNITED STATES PATENT OFFICE
CERTIFICATE OF CORRECTION

Patent No. 3,511,885       Dated May 12, 1970

Inventor(s)  William B. Hughes

It is certified that error appears in the above-identified patent and that said Letters Patent are hereby corrected as shown below:

Column 6, line 2, "minute" should read -- minutes --; line 29, delete "aluminum dichloride".

Signed and sealed this 1st day of September 1970.

(SEAL)
Attest:

EDWARD M. FLETCHER, JR.           WILLIAM E. SCHUYLER, JR.
Attesting Officer                 Commissioner of Patents